United States Patent
Robertson et al.

(10) Patent No.: US 10,393,238 B2
(45) Date of Patent: Aug. 27, 2019

(54) ACCESSORY DRIVE TENSIONER WITH IMPROVED ARRANGEMENT OF TENSIONER ARM AND BIASING MEMBER

(71) Applicant: Litens Automotive Partnership, Woodbridge (CA)

(72) Inventors: Matthew V. Robertson, Woodbridge (CA); Johnny Lu, North York (CA); Wei Ma, Richmond Hill (CA)

(73) Assignee: Litens Automotive Partnership, Woodbridge (CA)

( * ) Notice: Subject to any disclaimer, the term of this patent is extended or adjusted under 35 U.S.C. 154(b) by 76 days.

(21) Appl. No.: 15/563,769

(22) PCT Filed: Apr. 4, 2016

(86) PCT No.: PCT/CA2016/050388
§ 371 (c)(1),
(2) Date: Oct. 2, 2017

(87) PCT Pub. No.: WO2017/152255
PCT Pub. Date: Sep. 14, 2017

(65) Prior Publication Data
US 2018/0066733 A1 Mar. 8, 2018

Related U.S. Application Data

(60) Provisional application No. 62/142,300, filed on Apr. 2, 2015.

(51) Int. Cl.
*F16H 7/08* (2006.01)
*F16H 7/12* (2006.01)

(52) U.S. Cl.
CPC ............ *F16H 7/1209* (2013.01); *F16H 7/12* (2013.01); *F16H 7/1218* (2013.01);
(Continued)

(58) Field of Classification Search
CPC ............ F16H 7/1281; F16H 2007/081; F16H 2007/0874; F16H 2007/0893; F16H 2007/0806
(Continued)

(56) References Cited

U.S. PATENT DOCUMENTS 976,115 A * 11/1910 Bard .............................. 180/443
3,811,333 A * 5/1974 Castarede ............. F16H 7/1281
474/135
(Continued)

FOREIGN PATENT DOCUMENTS

DE 508156 A 9/1930
DE 19631507 A1 2/1998
(Continued)

OTHER PUBLICATIONS

Official Communication for EP16892945.3 dated May 14, 2019.

*Primary Examiner* — Henry Y Liu
(74) *Attorney, Agent, or Firm* — Millman IP Inc.

(57) ABSTRACT

In an aspect a tensioner is provided for a belt drive and includes a base, an arm with a pulley pivotally mounted to the base, and a biasing member. The pulley is rotatably mounted to the arm. The belt applies a hub load on the pulley and thereby applies a hub load moment on the arm along a first moment arm. The biasing member applies a biasing member moment on the arm along a second moment arm that is at least about 50 percent of the length of the first moment arm. The tensioner is mountable to an accessory frame via fasteners that each have a center distance from an accessory pulley axis, wherein the center distance is a value that is less than about 25 mm greater than the frame body diameter.

20 Claims, 9 Drawing Sheets

(52) U.S. Cl.
CPC ... *F16H 7/1281* (2013.01); *F16H 2007/0806* (2013.01); *F16H 2007/0808* (2013.01); *F16H 2007/0865* (2013.01); *F16H 2007/0891* (2013.01); *F16H 2007/0893* (2013.01); *F16H 2007/0897* (2013.01)

(58) Field of Classification Search
USPC .......................................................... 474/135
See application file for complete search history.

(56) References Cited

U.S. PATENT DOCUMENTS

| | | | | |
|---|---|---|---|---|
| 4,108,013 A | * | 8/1978 | Sragal | F16H 7/129 474/135 |
| 4,299,583 A | * | 11/1981 | Kraft | F02B 67/06 474/110 |
| 4,500,303 A | * | 2/1985 | Sermersheim | F16H 7/1281 424/117 |
| 4,571,223 A | * | 2/1986 | Molloy | F16H 7/1281 474/112 |
| 4,758,208 A | * | 7/1988 | Bartos | F16H 7/1281 474/135 |
| 4,822,321 A | * | 4/1989 | Webb | F02B 67/06 474/117 |
| 6,648,783 B1 | * | 11/2003 | Bogner | F16H 7/1281 474/134 |
| 6,652,401 B2 | * | 11/2003 | Liu | F16H 7/1209 474/134 |
| 7,118,504 B2 | * | 10/2006 | Meckstroth | F16H 7/1227 474/135 |
| 7,226,377 B2 | * | 6/2007 | Kraus | F16H 7/1209 474/117 |
| 7,468,013 B2 | * | 12/2008 | Di Giacomo | F16H 7/1281 474/134 |
| 7,494,434 B2 | * | 2/2009 | McVicar | F16H 7/1281 474/101 |
| 8,568,259 B2 | * | 10/2013 | Robbins | F16H 7/1281 474/135 |
| 8,602,930 B2 | * | 12/2013 | Deneszczuk | F16H 7/1281 474/112 |
| 8,968,128 B2 | * | 3/2015 | Wolf | F16H 7/1281 474/135 |
| 2004/0072642 A1 | * | 4/2004 | Serkh | F16H 7/1218 474/134 |
| 2004/0102271 A1 | * | 5/2004 | Serkh | F16H 7/1218 474/101 |
| 2006/0287146 A1 | * | 12/2006 | McVicar | F16H 7/1281 474/109 |
| 2009/2098631 | | 12/2009 | Jud et al. | |
| 2010/0144473 A1 | * | 6/2010 | Ward | F16H 7/1218 474/112 |
| 2010/0257951 A1 | * | 10/2010 | Quincerot | F02N 11/0814 74/6 |
| 2011/0070985 A1 | * | 3/2011 | Deneszczuk | F16H 7/1281 474/135 |
| 2011/0070986 A1 | * | 3/2011 | Maguire | F02B 67/06 474/135 |
| 2012/0178563 A1 | | 7/2012 | Lee et al. | |
| 2013/0079185 A1 | * | 3/2013 | Schauerte | F16H 7/1281 474/135 |
| 2013/0095967 A1 | | 4/2013 | Wolf et al. | |
| 2015/0057117 A1 | * | 2/2015 | Antchak | F16H 7/1263 474/109 |
| 2015/0219189 A1 | * | 8/2015 | Serkh | F16H 7/1218 474/112 |
| 2015/0285344 A1 | * | 10/2015 | Buchen | F16H 7/12 474/135 |
| 2015/0300462 A1 | * | 10/2015 | Serkh | F16H 7/1218 474/112 |
| 2015/0308545 A1 | * | 10/2015 | Harvey | F16H 7/1218 474/117 |
| 2016/0146312 A1 | * | 5/2016 | Pfeifer | F16H 7/08 474/135 |
| 2016/0230853 A1 | * | 8/2016 | Harvey | F02N 15/08 |
| 2017/0175858 A1 | * | 6/2017 | Ryeland | F02B 67/06 |

FOREIGN PATENT DOCUMENTS

| | | |
|---|---|---|
| DE | 19926615 A1 | 12/2000 |
| DE | 102011084680 B3 | 11/2012 |
| DE | 102011082330 A1 | 2/2013 |
| DE | 102013203957 B3 | 2/2014 |
| DE | 102012019038 A1 | 3/2014 |
| DE | 102012223086 A1 | 6/2014 |
| DE | 102013002993 A1 | 8/2014 |
| DE | 102013206010 B3 | 8/2014 |
| DE | 102013206101 B3 | 8/2014 |
| DE | 102013005884 A1 | 10/2014 |
| EP | 2128489 B1 | 8/2011 |
| EP | 2557295 A2 | 2/2013 |
| EP | 2573423 A1 | 3/2013 |
| EP | 12180562 | 4/2014 |
| WO | 2012049030 A1 | 4/2012 |
| WO | 2013087467 A1 | 6/2013 |
| WO | 2013159181 A1 | 10/2013 |
| WO | 2014090417 A1 | 6/2014 |
| WO | 2014100894 A1 | 7/2014 |
| WO | 2014127756 A1 | 8/2014 |

\* cited by examiner

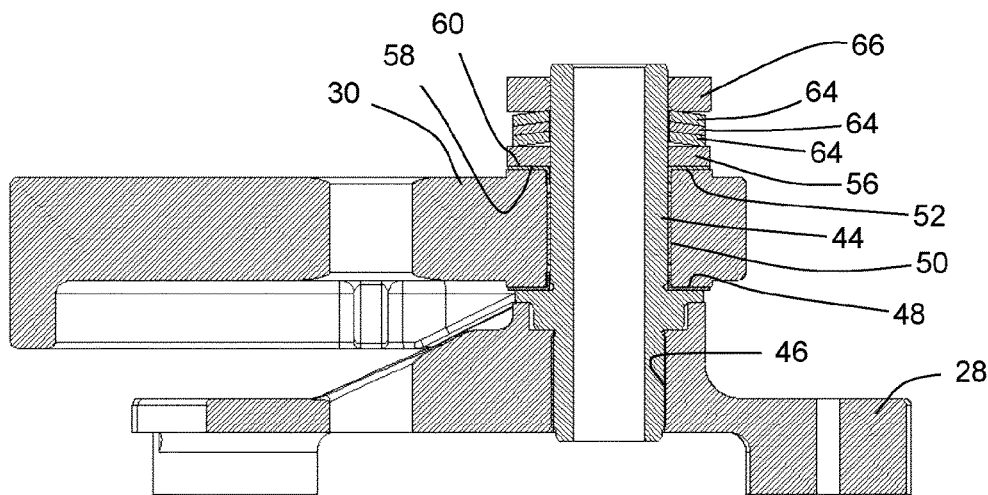
FIG. 4
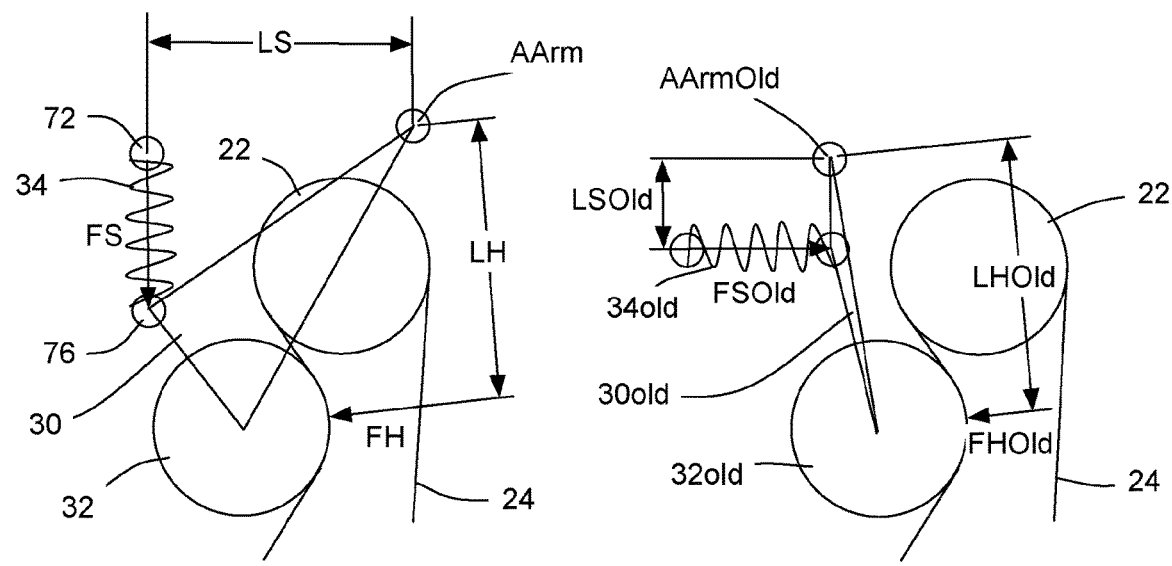
FIG. 5a
FIG. 5b
(PRIOR ART)

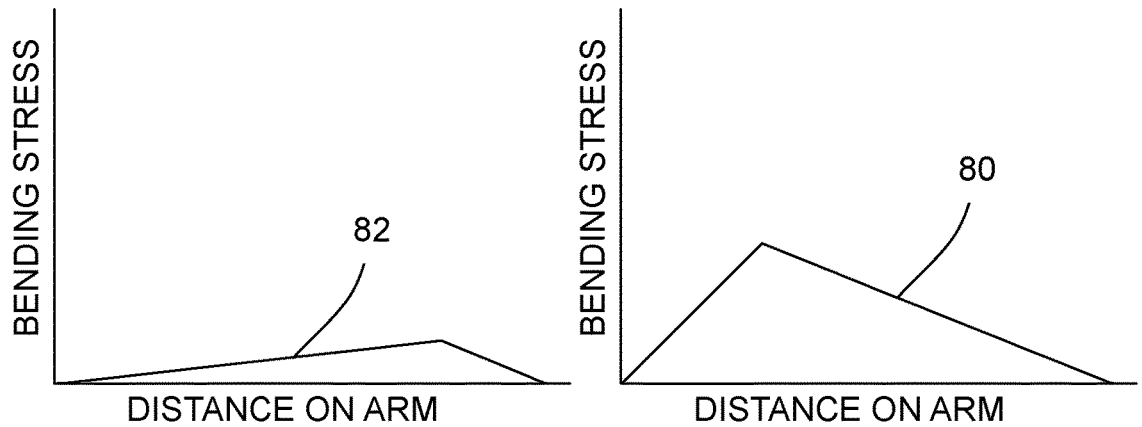
FIG. 6a
**FIG. 6b
(PRIOR ART)**
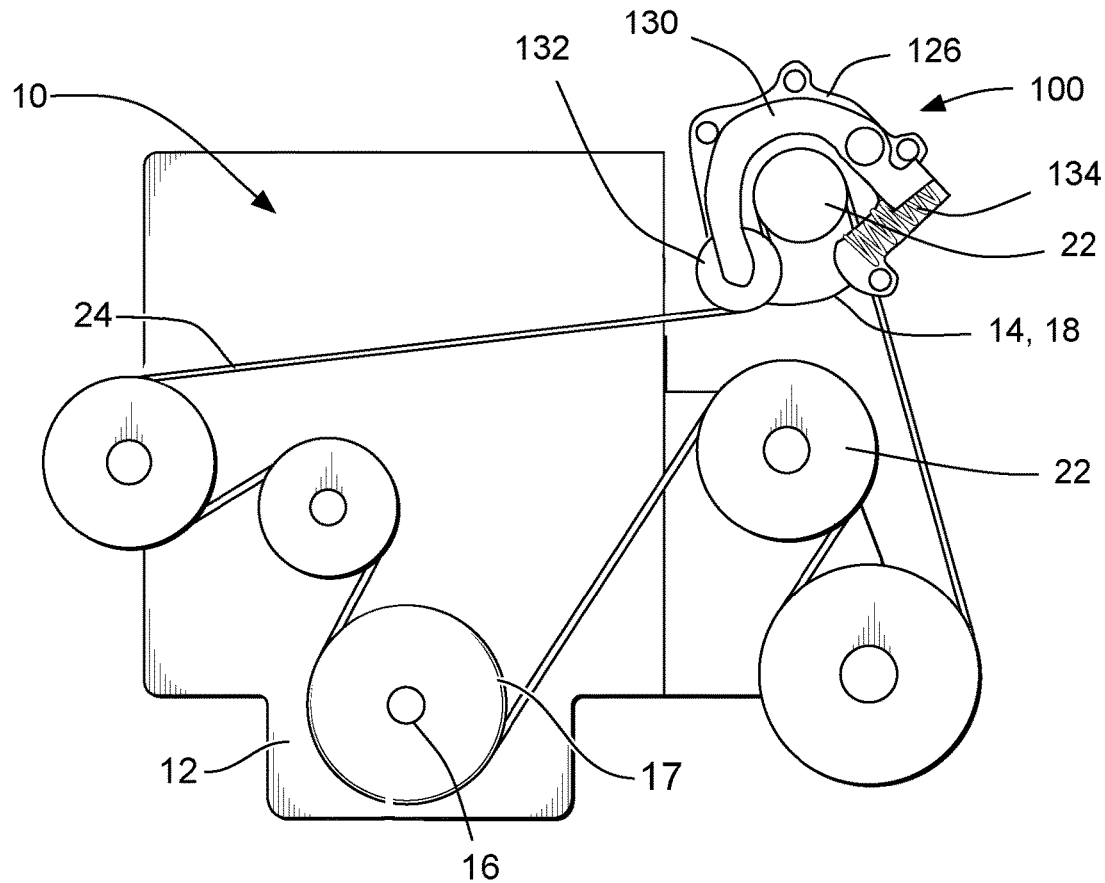
FIG. 7

ACCESSORY DRIVE TENSIONER WITH IMPROVED ARRANGEMENT OF TENSIONER ARM AND BIASING MEMBER

CROSS-REFERENCE TO RELATED APPLICATIONS

This application claims the benefit of U.S. Provisional Application No. 62/142,300, filed on Apr. 2, 2015, the contents of which are incorporated herein by reference in its entirety.

FIELD

This disclosure relates to tensioners for endless drive members and, in particular, to a tensioner that is mounted about a pulley of an accessory that is driven by an endless drive member that is itself driven by a vehicular engine.

BACKGROUND OF THE DISCLOSURE

It is common for vehicle engines to drive a plurality of accessories using an accessory drive system that includes a belt. In general, a tensioner is used to maintain tension on the belt, to inhibit belt slip during transient events and to inhibit the belt from coming off the associated pulleys of the driving and driven components.

In non-hybrid vehicles, the engine is the sole means of driving the belt and the associated components. Typically, one of the driven components in such a case is an alternator, which is driven by the belt to generate electricity that is used to charge the vehicle's battery.

In hybrid vehicles, a secondary motive device is provided for driving the belt. The secondary motive device (e.g. a motor/generator unit (MGU)) can be used for a number of purposes, such as, for example, driving one or more accessories via the belt when the engine is temporarily off while the vehicle is stopped for a short period of time (e.g. at a stoplight), a feature referred to as ISAF (Idle-Stop Accessory Function). Another purpose is for use as part of a belt alternator start (BAS) drive system, in which the MGU is used to start the engine via the belt. Yet another purpose is to supply additional power to the engine when needed (e.g. when the vehicle is under hard acceleration), referred to sometimes as a Boost mode.

In both non-hybrid and hybrid vehicles, particularly those with small engines, there is relatively little room for belt tensioners. Some manufacturers have attempted to fit tensioners to an end face of the frame of the alternator or MGU as the case may be, but with varying degrees of success. Such tensioners are sometimes arranged in a way that would interfere with other engine components in some instances, and would therefore be unusable on many engines. Other problems exist with certain examples of such tensioners. There is therefore a need for a tensioner that can at least partially address some of the shortcomings with currently proposed tensioners that are mounted to the MGU or alternator frame

SUMMARY OF THE DISCLOSURE

In an aspect a tensioner is provided for an endless drive arrangement for an engine having a crankshaft, a crankshaft pulley, an endless drive member that is engageable with the crankshaft pulley, an accessory including an accessory frame having a generally cylindrical body having a frame body diameter, an accessory shaft that is rotatable relative to the accessory frame and an accessory pulley that is mounted to the accessory shaft and is rotatable about an accessory pulley axis. The tensioner includes a base, a tensioner arm with a tensioner pulley thereon, and a tensioner biasing member. The tensioner arm is generally concave and is pivotally mounted to the base for pivotal movement about an arm pivot axis that is offset from the accessory pulley axis. The tensioner pulley is rotatably mounted to the tensioner arm for rotation about a tensioner pulley axis that is offset relative to the arm pivot axis and relative to the accessory pulley axis. The endless drive member engages the tensioner pulley and applies a hub load on the tensioner pulley and thereby applies a hub load moment on the tensioner arm along a first moment arm relative to the arm pivot axis. The tensioner biasing member urges the tensioner arm into the endless drive member and applies a biasing member moment on the tensioner arm that opposes the hub load moment along a second moment arm relative to the arm pivot axis. The second moment arm is at least about 50 percent of the length of the first moment arm. The tensioner is mountable to the accessory frame via a plurality of fasteners that are each positioned at a center distance from the accessory pulley axis, wherein the center distance for each of the fasteners from the plurality of fasteners is between a value of zero inches from the accessory pulley axis to a value that is less than about 25 mm greater than the frame body diameter.

In another aspect, a tensioner is provided for an endless drive arrangement for an engine having a crankshaft, a crankshaft pulley, an endless drive member that is engageable with the crankshaft pulley, an accessory including an accessory frame, an accessory shaft that is rotatable relative to the accessory frame and an accessory pulley that is mounted to the accessory shaft and is rotatable about an accessory pulley axis. The tensioner includes a base, a tensioner having a tensioner pulley thereon, and a tensioner biasing member. The tensioner arm is generally concave and is pivotally mounted to the base for pivotal movement about an arm pivot axis that is offset from the accessory pulley axis. The tensioner pulley is rotatably mounted to the tensioner arm for rotation about a tensioner pulley axis that is offset relative to the arm pivot axis and relative to the accessory pulley axis. The tensioner biasing member urges the tensioner arm into the endless drive member. The tensioner biasing member is a compression spring. The tensioner is mountable to the accessory frame via a plurality of fasteners that are each positioned at a center distance from the accessory pulley axis. The center distance for each of the fasteners from the plurality of fasteners is between a value of zero inches from the accessory pulley axis to a value that is less than about 25 mm greater than the frame body diameter. The arm pivot axis and the tensioner pulley axis have an angular offset of between about 135 degrees and about 225 degrees about the accessory pulley axis.

In yet another aspect, a tensioner is provided for an endless drive arrangement for an engine having a crankshaft, a crankshaft pulley, an endless drive member that is engageable with the crankshaft pulley, an accessory including an accessory frame having a generally cylindrical body having a frame body diameter, an accessory shaft that is rotatable relative to the accessory frame and an accessory pulley that is mounted to the accessory shaft and is rotatable about an accessory pulley axis. The tensioner includes a base, a tensioner arm with a tensioner pulley thereon, and a tensioner biasing member. The tensioner arm is generally concave and is pivotally mounted to the base for pivotal movement about an arm pivot axis that is offset from the accessory pulley axis. The tensioner pulley is rotatably mounted to the tensioner arm for rotation about a tensioner pulley axis that is offset relative to the arm pivot axis and relative to the accessory pulley axis. The endless drive member engages the tensioner pulley and applies a hub load on the tensioner pulley and thereby applies a hub load moment on the tensioner arm along a first moment arm relative to the arm pivot axis. The tensioner biasing member urges the tensioner arm into the endless drive member and applies a biasing member moment on the tensioner arm that opposes the hub load moment along a second moment arm relative to the arm pivot axis. The tensioner may have any one or more of the following four features:

a) The second moment arm is at least about 50 percent of the length of the first moment arm.

b) The tensioner biasing member may be a compression spring, such as, for example, a helical compression spring.

c) The tensioner may be mountable to the accessory frame via a plurality of fasteners that are each positioned at a center distance from the accessory pulley axis, wherein the center distance for each of the fasteners from the plurality of fasteners is between a value of zero inches from the accessory pulley axis to a value that is less than about 25 mm greater than the frame body diameter.

d) The arm pivot axis and the tensioner pulley axis have an angular offset of between about 135 degrees and about 225 degrees about the accessory pulley axis.

In some embodiments, the tensioner has exactly one of the aforementioned four features. In some embodiments, the tensioner has exactly two of the aforementioned four features. In some embodiments the tensioner has exactly three of the aforementioned features. In some embodiments, the tensioner has all four of the aforementioned features.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 1b is a perspective view of the tensioner shown in FIG. 1a;

FIG. 2 is an exploded view of the tensioner shown in FIG. 1a;

FIG. 3 is a front elevation view of the tensioner shown in FIG. 1a;

FIG. 4 is a sectional view of the tensioner shown in FIG. 1a;

FIG. 5a is a schematic illustration of forces applied to the tensioner arm from the tensioner shown in FIG. 1a;

FIG. 5b is a schematic illustration of forces applied to the tensioner arm from a prior art tensioner;

FIG. 6a is a graph showing the bending stresses on the tensioner arm from the tensioner shown in FIG. 1a;

FIG. 6a is a graph showing the bending stresses on the tensioner arm from the prior art tensioner;

FIG. 7 is a side view of an engine having a tensioner, according to another non-limiting embodiment of the present disclosure;

DETAILED DESCRIPTION

Figure 1A:
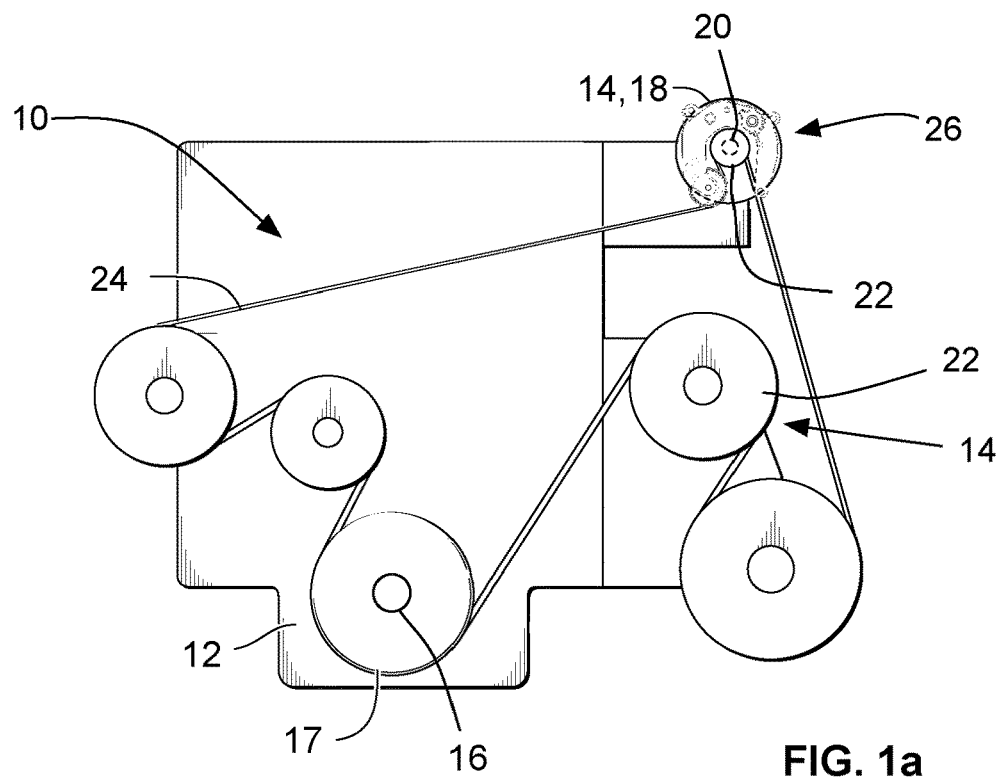
FIG. 1a is a side view of an engine having a tensioner, according to a non-limiting embodiment of the present disclosure.

Reference is made to FIG. 1a, which shows an endless drive arrangement 10 for an engine 12. The endless drive arrangement 10 is used to transfer power between the engine 12 and one or more accessories 14. The engine 12 has a crankshaft 16, on which there is mounted a crankshaft pulley 17.

Figure 1B:
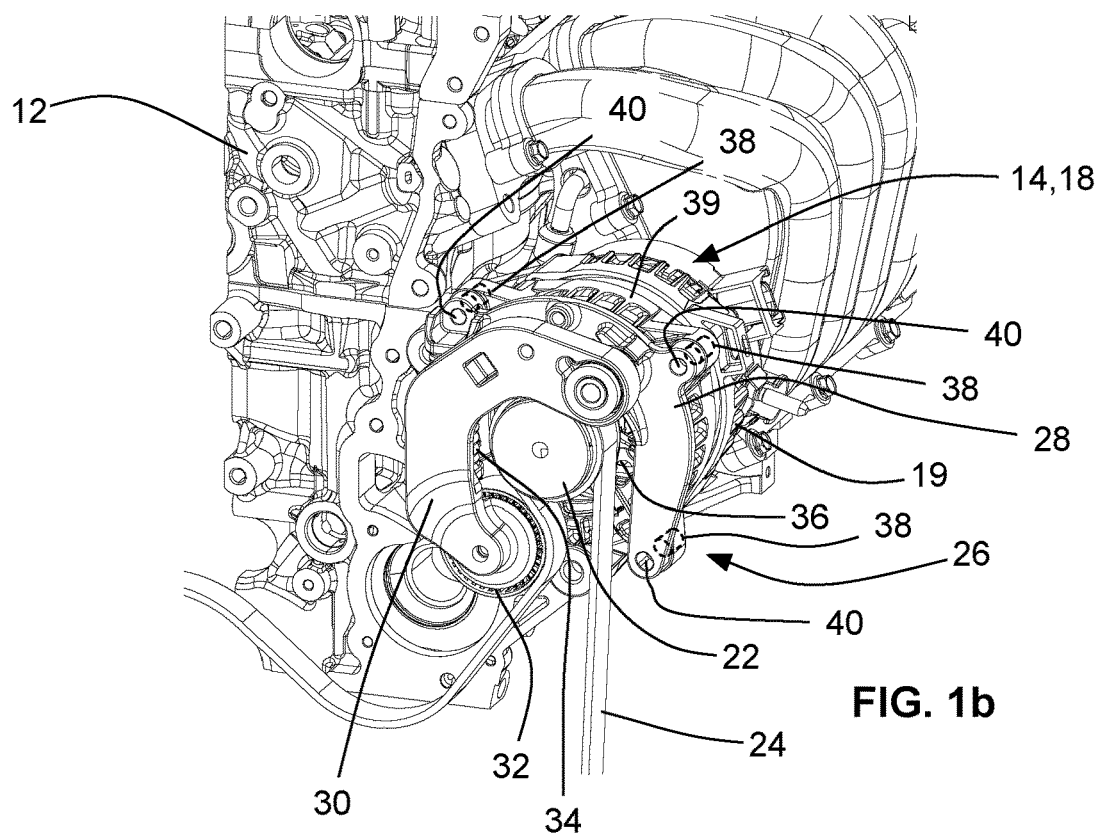

Reference is made to FIG. 1b which shows an example one of the accessories 14, namely an alternator 18. As shown with the example accessory in FIG. 1b, each accessory 14 may have an accessory frame 19, an accessory shaft 20 that is rotatable relative to the accessory frame 19, and an accessory pulley 22 that is mounted on the accessory shaft 20 and is rotatable with the accessory shaft 20 about an accessory pulley axis AAcc.

Referring to FIG. 1a, the endless drive arrangement 10 includes an endless drive member 24, such as an accessory drive belt, that is drivable by the crankshaft pulley 17, and which, in turn, drives the accessory pulleys 22 of the one or more accessories 14. For convenience the endless drive member 16 may be referred to as a belt 16. However it will be understood that any other type of suitable endless drive member may be used.

Tensioner with Engagement with Biasing Member Between Arm Pivot Axis and Pulley Axis A tensioner 26 is provided to maintain tension in the endless drive member 16. The tensioner 26 is shown in more detail in FIGS. 2 and 3. The tensioner 26 includes a tensioner base 28 (which may also simply be referred as the base 28 for convenience), a tensioner arm 30 with a tensioner pulley 32 thereon, and a tensioner biasing member 34. The tensioner base 28 is mountable to the accessory frame 19. In the embodiment shown in FIG. 1b, the accessory frame 19 has an end face 36 from which the accessory shaft 20 extends. The accessory frame 19 has a plurality of first fastener apertures 38 which may be positioned on mounting ears 77. The accessory frame 19 further has an accessory frame body 39 that is generally cylindrical and that has a diameter DAcc. The tensioner base 28 includes a plurality of second fastener apertures 40 which are aligned with the plurality of first fastener apertures 38. A plurality of base mounting fasteners 41 (FIG. 3) such as bolts 42 may be used to pass through the apertures 40 and into the apertures 38 to mount the tensioner base 28 to the accessory frame 18. The apertures 38 may be threaded to retain the fasteners 41 for this purpose. The apertures 38 need not be pass-through apertures, but could be if desirable. In some embodiments, nuts are used to receive the bolts 42. In such a case the apertures 38 would be pass-through apertures so that the bolts 42 could pass-through both the apertures 40 and 38 and into the nuts.

The tensioner arm 30 is pivotally mounted to the tensioner base 28 for pivotal movement about an arm pivot axis AArm that is offset from the accessory pulley axis AAcc. In the embodiment shown in FIG. 2-4, the pivotal connection of the tensioner arm 30 to the tensioner base 28 is provided by means of a hollow shaft member 44 that is press-fit into an aperture 46 (FIG. 4) in the tensioner base 28 and which pivotably supports the tensioner arm 30 via a plurality of bushings 48, 50 and 52. The bushings 48, 50 and 52 may be made from any suitable materials such as nylon impregnated with PTFE. The bushings 48, 50 and 52 may be configured to be fixed to the tensioner arm 30 so that they pivot about the hollow shaft member 44 along with the tensioner arm 30.

A damping structure 54 may optionally be provided, which includes a first damping member 56 that has a first friction surface 58 thereon that is fixed to the shaft member 44, and which engages a second friction surface 60 that is on an axially outer face of the bushing 52. Thus, the bushing 52 may additionally be referred to as a second damping member. The damping structure 54 may further include a damping structure biasing structure 62 that is positioned to urge the first damping member 56 (and therefore the first friction surface 58) into engagement with the second friction surface 60 with a selected force. The damping structure biasing structure 62 may include, for example, a plurality of Belleville washers 64. A tensioner arm locking member 66 may be press-fit onto a distal end of the shaft member 44 to lock the tensioner arm 30 on the shaft member 44 and may be positioned to provide a reference surface which the Belleville washers 64 abut so as to urge the friction surfaces 58 and 60 against one another. An example of a suitable damping structure 54 is shown in U.S. Pat. No. 8,591,358, the contents of which are incorporated herein by reference.

The tensioner pulley 32 is rotatably mounted to the tensioner arm 30 for rotation about a tensioner pulley axis ATP that is offset relative to the arm pivot axis AArm and relative to the accessory pulley axis AAcc. The rotatable mounting to the tensioner arm 30 may be by any suitable means. For example, the pulley 32 may include a pulley bearing 68 that mounts to a shoulder bolt 69 that, in turn, mounts to the tensioner arm 30. A dust shield 70 is provided to inhibit the migration of dust and other contaminants into the pulley bearing 68.

In some embodiments, the tensioner pulley axis ATP is angularly offset by an offset angle OA that is between about 135 degrees and about 225 degrees along the tensioner arm 30 relative to the arm pivot axis AArm, about the accessory pulley axis AAcc. In some embodiments, the offset angle may be, for example, about 180 degrees. This offset angle is discussed further below.

Figure 2:
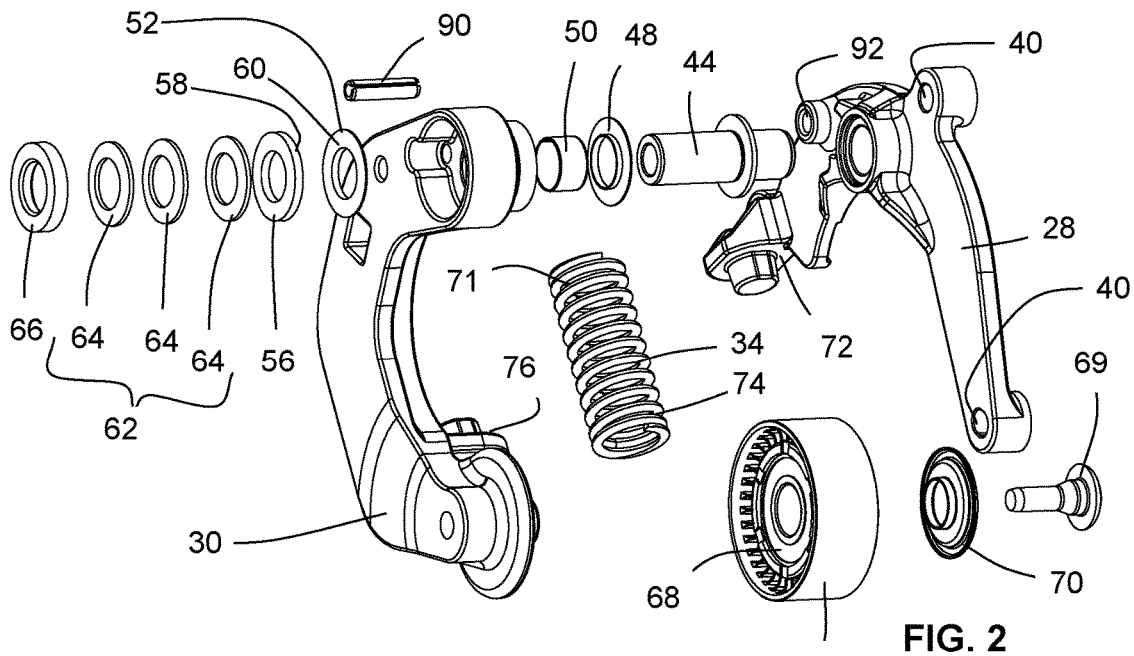
Figure 3:
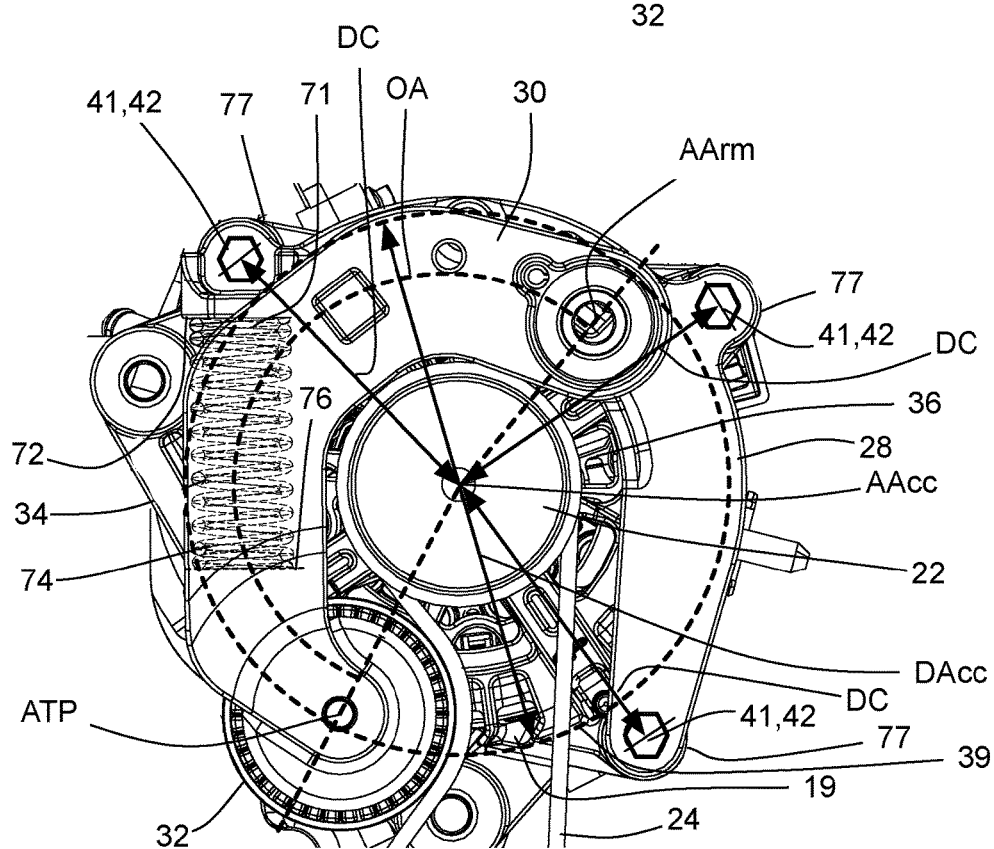

The tensioner biasing member 34 urges the tensioner arm 30 into the belt 30, which is a direction that may be referred to as a 'free arm' direction. The tensioner biasing member 34 may be any suitable type of biasing member, such as a compression spring. The tensioner biasing member 34 has a first end 71 that engages a first end support surface 72 on the base 28 and a second end 74 that engages a second end support surface 76 on the tensioner arm 30. Examples of suitable compression springs for the biasing member 34 include a helical compression spring (as shown in FIGS. 2-4), and a closed-cell foam spring.

In at least some embodiments, the tensioner 26 is arranged such that its mounting to the accessory frame 19 applies relatively small moments and therefore relatively low stresses are incurred by the accessory frame as a result. The low stresses are achieved by mounting the tensioner 26 to the accessory frame 19 via a plurality of fasteners (e.g. bolts 42) that are each positioned at a center distance (shown at DC in FIG. 3) from the accessory pulley axis AAcc that is between a value of zero inches from the accessory pulley axis AAcc to a value that is less than about 25 mm greater than the frame body diameter DAcc. This is a direct result of the arrangement of the components of the tensioner 26 which ensures that none of the components is required to extend far from the accessory frame body 39. In some embodiments, the fasteners (e.g. bolts 42) are positioned with center distances DC that are between a value of zero inches from the accessory pulley axis AAcc to a value that is less than about 8 mm greater than the frame body diameter DAcc.

Figure 8:
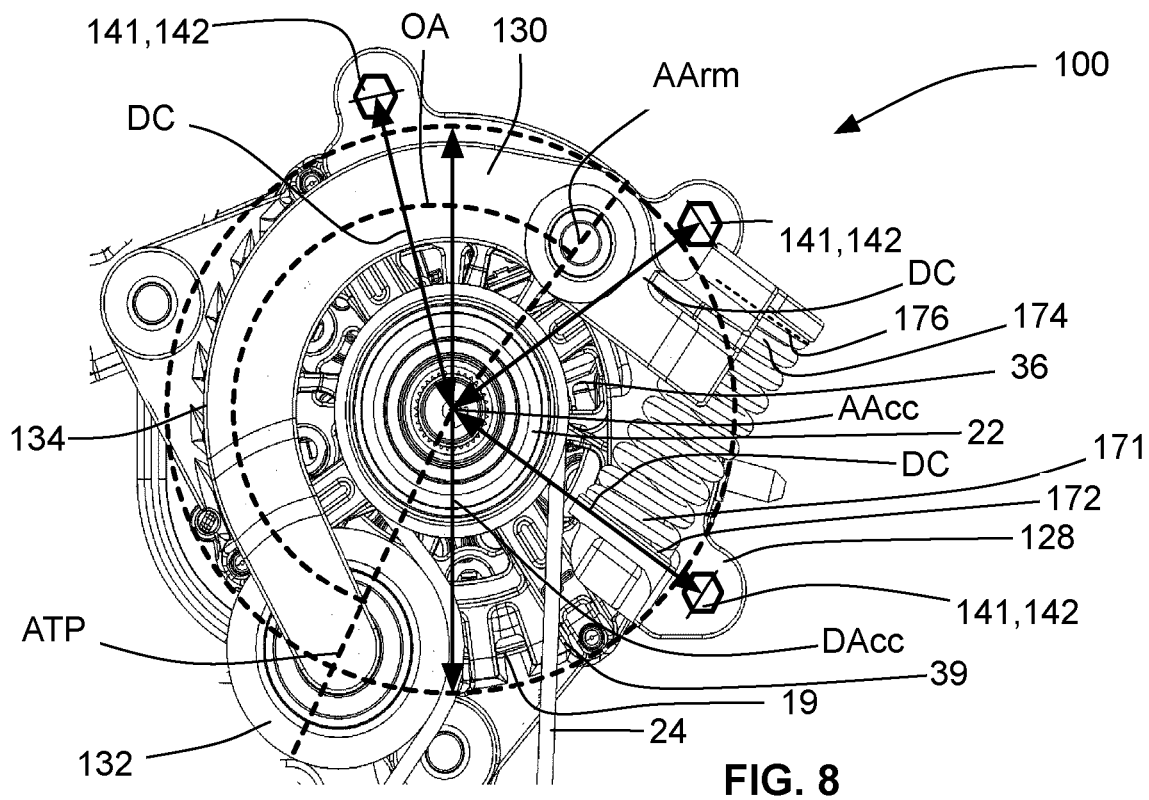
FIG. 8 is a front elevation view of the tensioner shown in FIG. 7.
Figure 9:
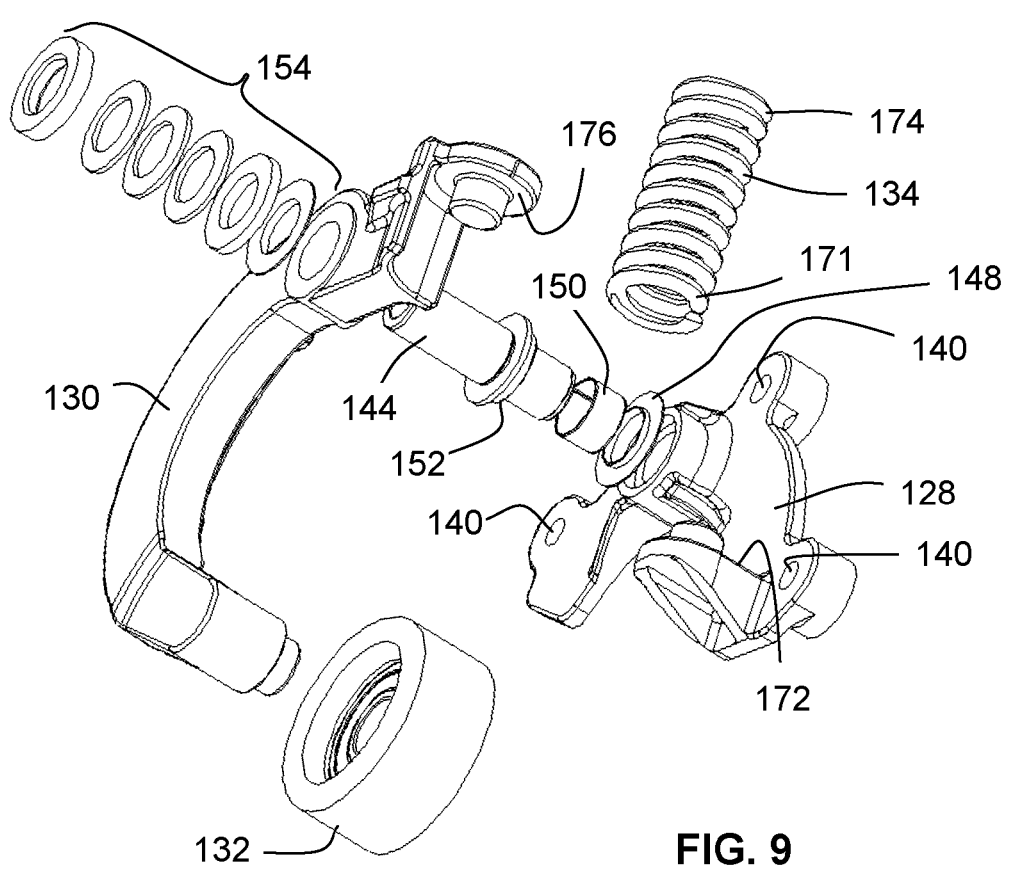
FIG. 9 is an exploded view of the tensioner shown in FIG. 7.
Figure 10:
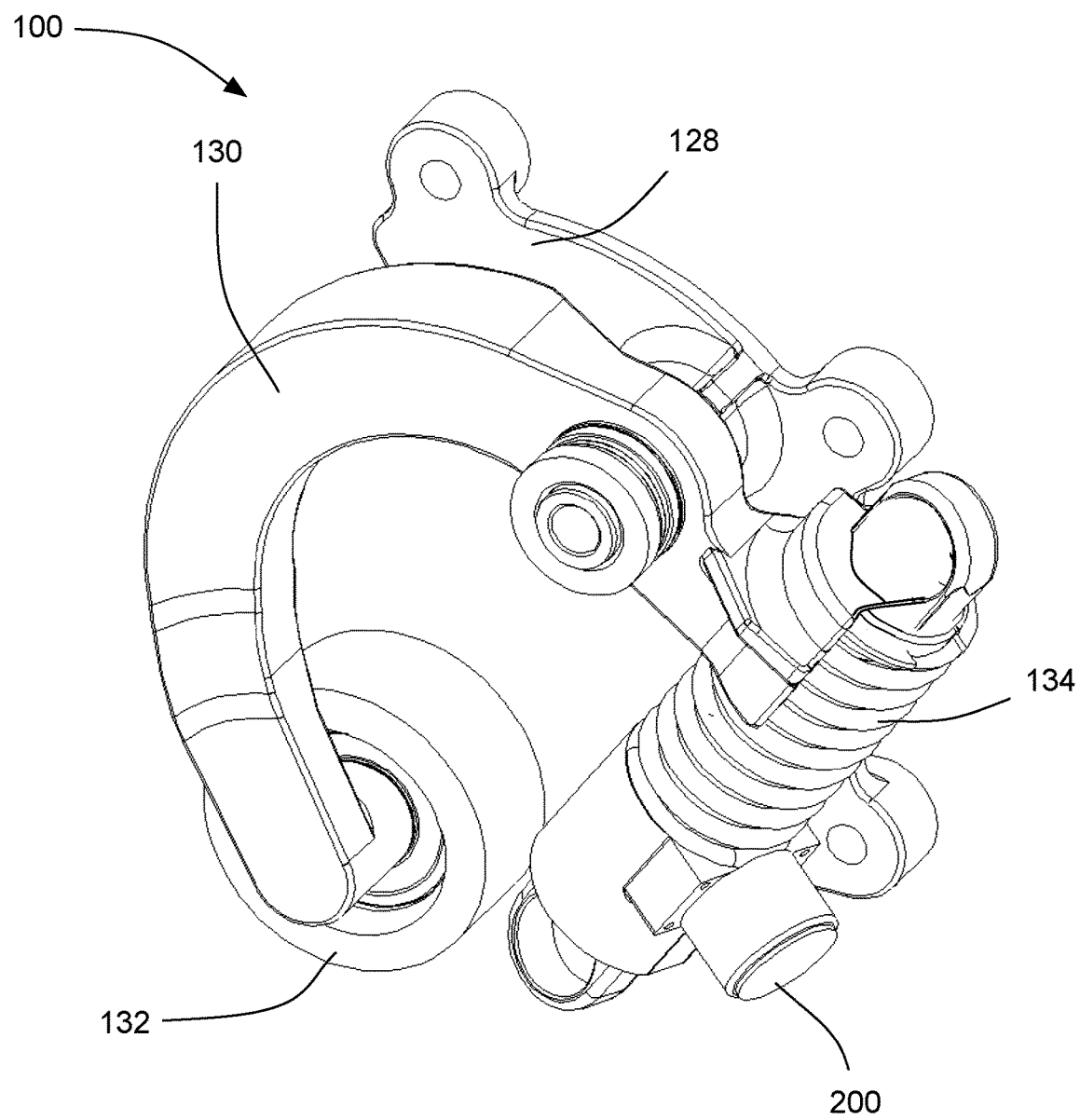
FIG. 10 is a perspective view of the tensioner shown in FIG. 7 with an optional control structure.

It has been found that the manufacturers of the accessory, particularly where the accessory is an alternator or an MGU, are reluctant to modify the frame to permit connection to a tensioner component that extends radially far from the surface of the frame body 39. This may be due to the high stresses that can be incurred by the frame as a result, necessitating the reinforcement of the frame in some instances, which can drive up cost and weight. An example of such a frame configuration is shown in FIGS. 8, 9 and 10 of German patent application publication DE 10 2012 019 038 A1.

In the embodiment shown in FIGS. 1-4, the base 28 is the only part of the tensioner 26 that mounts directly to the accessory frame 19. The tensioner biasing member 34 mounts between the base 28 and the tensioner arm 30; the tensioner arm 30 mounts to the base 28; and the tensioner pulley 32 mounts to the arm 30, as noted above. It will be understood, however, that this need not be the case. For example, one end of the tensioner biasing member 34 could mount directly to a mounting ear on the alternator frame 19 instead of mounting to the base 28.

It will also be noted that, separate from the center distances of the fasteners (e.g. bolts 42) being positioned so as not to cause large stresses on the accessory frame 19, the configuration o\ the tensioner 26 is advantageous in that the components of the tensioner 26 (e.g. such as the base 28, the tensioner biasing member 34 and the tensioner arm 30) do not extend radially significantly beyond frame body diameter DAcc. As a result, the base 28, the tensioner arm 30 and the tensioner biasing member 34 can typically be mounted to the alternator 28 without interfering with other engine-related components. This is especially useful in vehicles with relatively small engines, which are relatively common currently, since there is sometimes very little space for tensioners on such engines.

Some tensioners of the prior art are also configured to fit in a relatively small space radially, but suffer from certain deficiencies. For example, in some cases, such tensioners are 'orbital' tensioners, in the sense that the tensioner pulley is mounted on an arcuate arm that slides on an arcuate path on the base, so that the tensioner pulley follows an arcuate path about the axis of rotation of the alternator pulley. Such tensioners can be difficult to control so that they provide consistent performance over the course of their operating life. Such tensioners sometimes employ a large torsion spring in order to urge the tensioner pulley into the belt. Such a large torsion spring is needed to clear the alternator pulley, however it is not ideal from a packaging point of view. Some other tensioners of the prior art employ biasing members that are more compact than a large, helical torsion spring, but they apply a moment to the tensioner arm at a relatively small moment arm, relative to the moment applied by the hub load on the tensioner arm that arises from engagement of the tensioner pulley with the belt. In order to compensate for the large difference in the moment arms, the biasing member in such cases may be made with a relatively high spring rate, which is undesirable from the point of view of providing good isolation and maintaining relatively low belt tension where possible.

Another type of prior art tensioner employs a pivoting arm and is represented in FIG. 5b. This tensioner employs a tensioner arm (shown at 30*old*) that pivots about a pivot axis (AArmOld) and has a pulley (shown at 32*old*) thereon. A tensioner biasing member shown at 34*old* urges the tensioner arm 30*old* to drive the pulley 32*old* into the belt 24. As can be seen, the biasing member 34*old* extends out in a manner that would increase the likelihood of interference with other engine-related components and engages the arm 30*old* at a point where the moment applied by the biasing member 34*old* is at a relatively short moment arm LSold about the arm pivot axis AArmOld, in comparison to the moment arm LHold. As a result, in order to achieve equilibrium between the hub load moment and the biasing member moment, the biasing member force shown at FSold is generally high. This introduces relatively high bending stresses in the tensioner arm 30*old*. The bending stresses over the length of the tensioner arm 30*old* are shown by the curve 80 in FIG. 6*b*.

Furthermore, the orientation of the biasing member 34*old* results in its distal end being positioned far from cylindrical surface of the accessory frame to which it is mounted. To support it, a bracket is formed into accessory frame that extends relatively far from the cylindrical surface of the accessory frame. This introduces significant stresses into the accessory frame which necessitate reinforcing the accessory frame to compensate for them, which can increase the cost of the accessory frame undesirably.

By contrast the present tensioner 26 employs a tensioner arm 30 that pivots and does not 'orbit' and, in at least some embodiments, employs a biasing member (e.g. biasing member 34) that applies a moment on the tensioner arm 30 with a moment arm LS that is at least about 50 percent of the size of the moment arm LH associated with the hub load moment applied by the belt 24 via the tensioner pulley 32, and, in at least some embodiments, mounts to the accessory frame via fasteners (e.g. bolts 42) that have a center distance to the accessory pulley axis AAcc that is between a value of zero inches from the accessory pulley axis AAcc to a value that is less than about 25 mm greater than the frame body diameter DAcc, as noted above. In some embodiments, the biasing member 34 may apply a moment on the tensioner 30 with a moment arm LS that is at least about 80 percent of the size of the moment arm LH associated with the hub load moment applied by the belt 24. In some embodiments, the biasing member 34 may apply a moment on the tensioner 30 with a moment arm LS that is substantially equal to the size of the moment arm LH associated with the hub load moment applied by the belt 24.

FIG. 5*a* is a schematic diagram that represents the forces and moment arms associated with the tensioner shown in FIGS. 2-4. As can be seen in FIG. 5*a*, the moment arm shown at LS is the moment arm of the spring force shown at FS. The moment arm LS can be large, (e.g. at least about 50 percent of the moment arm shown at LH, for the hub load shown at FH), which is in direct contrast with the moment arm for the tensioner represented in FIG. 5*b*. Worded another way, the endless drive member 24 engages the tensioner pulley 32 and applied a hub load force FH on the tensioner pulley 32. As a result, the endless drive member 24 applies a hub load moment on the tensioner arm 30, which is based on the hub load force FH and a first moment arm (i.e. moment arm LH) relative to the arm pivot axis AArm. The tensioner biasing member 34 applies a biasing member moment on the tensioner arm 30 that opposes the hub load moment, along a second moment arm (i.e. moment arm LS) relative to the arm pivot axis AArm. The second moment arm LS may be at least 50 percent of the length of the first moment arm LH. In some embodiments, the second moment arm LS may be at least 80 percent of the length of the first moment arm LH. In some embodiments, the second moment arm LS may be substantially equal to the length of the first moment arm LH. As a result, the force applied by the biasing member 34 (i.e. the force FS) may be smaller than the force applied by the biasing member 34*old* (i.e. the force FSold). This introduces relatively smaller bending stresses into the tensioner arm 30 as compared to the bending stresses incurred by the tensioner arm 30*old*. The bending stress for the tensioner arm 30 over the length of the arm 30 is shown by the curve 82 in FIG. 6*a*.

It will further be noted that, in the embodiment shown in FIG. 3, the tensioner biasing member 34 is substantially completely superimposed axially with the tensioner arm. In other words, when viewed in an axial direction, the tensioner biasing member 34 is substantially entirely hidden. It will further be noted that, in the embodiment shown in FIG. 3, the tensioner arm is concave about accessory pulley axis AAcc. This concavity, in combination with the large offset angle OA between the arm pivot axis AArm and the tensioner pulley axis ATP of between about 135 degrees and about 225 degrees permits the tensioner biasing member 34 to be arranged so that its distal end (i.e. first end 71) remains relatively close to the accessory pulley axis AAcc (so that the tensioner 26 can mount to the accessory 18 using fasteners with the relatively short center distances described above).

Insertion of Load Stop Pin after Installation of Tensioner

Referring to FIG. 2, the tensioner 26 may optionally include a pin 90. The pin 90 may mount into an aperture 92 in the base 28 and may be used to provide a limit surface to limit the movement of the tensioner arm 30 in the load stop direction during use. To facilitate installation of the tensioner 26 on the accessory 14, however, it may be desirable to pivot the tensioner arm 30 past the point where the pin 90 would be positioned in order to provide clearance for the belt 24. Then, once the tensioner 26 is installed, the arm 30 can be permitted to pivot in the free-arm direction to engage the belt 24. Once the arm 30 has pivoted sufficiently, the aperture 92 for receiving the pin 90 is no longer obscured by the arm 30 and can receive the pin 90. The pin 90 can be inserted lockingly into the aperture 92 in any suitable way, such as by press-fit, or any other suitable means, and can then act as a load stop for the arm 30.

Tensioner with Arm Pivot Axis Between Engagement with Biasing Member and Pulley Axis Reference is made to FIG. 7, which shows a tensioner 100 in accordance with another embodiment of the present disclosure. The tensioner 100 includes a tensioner base 128 (also referred as the base 128 for convenience) which may be similar to the base 28, a tensioner arm 130 that is similar to the tensioner arm 30, with a tensioner pulley 132 thereon, that is similar to pulley 32, and a tensioner biasing member 134 that is similar to the biasing member 34. The tensioner 100 is mountable to the accessory frame 19 via fasteners 141 such as bolts 142 which pass through second apertures 140 in the base 128 and into first apertures 38, in the same manner as the tensioner 26 shown in FIG. 1*b* uses fasteners 42 to mount to the accessory frame 19. However, in the embodiment shown in FIG. 8, the apertures 38 on the accessory frame 19 are arranged differently, to accommodate the different arrangement of the tensioner biasing member 134 as compared to the tensioner biasing member 34 in the embodiment shown in FIGS. 2-4.

The tensioner 100 may be similar to the tensioner 26 in several respects. For example, the tensioner arm 130 pivots and does not 'orbit' and, in at least some embodiments, the offset angle OA about the accessory pulley axis AAcc, between the tensioner pulley axis ATP (FIG. 8) and the arm pivot axis AArm is between about 135 degrees and about 225 degrees along the tensioner arm 30. In some embodiments, the offset angle may be, for example, about 180 degrees. In addition, the tensioner arm 130 mounts to the accessory frame via fasteners 141 (e.g. bolts 142, shown in FIG. 8) that have a center distance DC to the accessory pulley axis AAcc that is between a value of zero inches from the accessory pulley axis AAcc to a value that is less than about 25 mm greater than the frame body diameter DAcc, as noted above. In some embodiments, the fasteners (e.g. bolts 42) are positioned with center distances DC that are between a value of zero inches from the accessory pulley axis AAcc to a value that is less than about 8 mm greater than the frame body diameter DAcc. In addition the tensioner biasing member 134 may be a compression spring in similar manner to the biasing member 34 shown in FIGS. 2-4. An example of a suitable compression spring for the biasing member 134, may be, a helical compression spring, a closed-cell foam spring or any other kind of compression spring.

The tensioner biasing member 134 has a first end 171 that engages a first end support surface 172 on the base 128 and a second end 174 that engages a second end support surface 176 on the tensioner arm 130.

A difference between the tensioner 100 and the tensioner 26 is that, as noted above, the biasing member 134 is arranged in a different place in relation to the rest of the tensioner 100, as compared to the biasing member 34 in relation to the rest of the tensioner 26. As can be seen in FIG. 8, the second end support surface 176 on the tensioner arm 130 is outside of a range between the arm pivot axis AArm and the tensioner pulley axis ATP.

The tensioner 100 may employ a damping structure 154 that may be similar to the damping structure 54, and bushings 148, 150 and 152 that are provided on a hollow shaft 144, and which are similar to the bushings 48, 50 and 52 and hollow shaft 44.

The tensioners 26 and 100 may be used on engines which are not part of a hybrid powertrain. As such, an MGU or the like is not provided as a separate means for driving the belt 24. As a result, the belt span on the 'upstream' side of the alternator 18, is normally slack relative to the belt span on the 'downstream' side of the alternator 18, when the engine is driving the belt 24, and remains the slack span of the belt 24 throughout operation of the engine. In embodiments such as those shown in FIGS. 1a-9, which may be passive tensioners and which have one arm and one pulley, the tensioner 26 or 100 may be used with non-hybrid powertrains where the engine is always the motive device that drives the belt 24.

Tensioner with Hydraulic Strut

Figure 11:
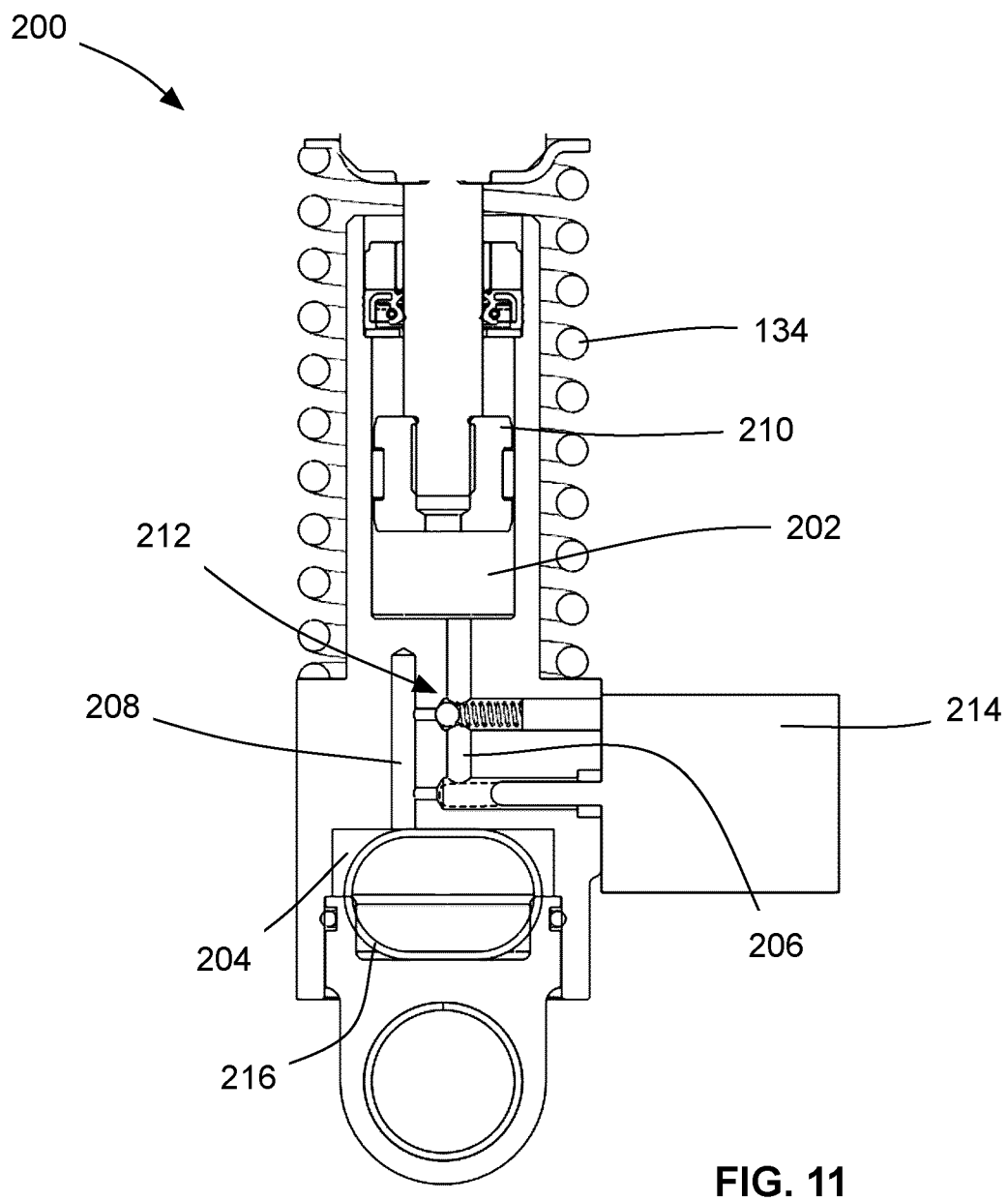
FIG. 11 is a sectional elevation view of the control structure shown in FIG. 10.

Reference is made to FIGS. 10 and 11, which shows the tensioner 100, wherein the biasing member 134 forms part of a tensioner strut shown at 200. The tensioner 100 in this instance can be used with a hybrid powertrain, in which the accessory 14 is not an alternator, but is instead an MGU, such that the belt span normally identified as being relatively slack becomes the tighter belt span when the MGU is powered so as to drive the belt 24. The tensioner strut 200 is controllable during use to prevent compression of the tensioner strut 200 at any of a plurality of selectable positions. Optionally, the tensioner strut 200 may be hydraulically controlled, and may include a main piston chamber 202, a reservoir 204, and first and second fluid passageways 206 and 208 connecting the main piston chamber 202 and the reservoir 204. A main piston 210 is movable in the main piston chamber 202. A check valve 212 is positioned to prevent fluid flow in a first fluid flow direction between the main piston chamber 202 and the reservoir 204 through the second passageway 208 and to permit fluid flow in an opposing fluid flow direction between the reservoir 204 and the main piston chamber 202 through the second fluid passageway 208. A control valve 214 is positioned in the first fluid passageway 206 and is movable between a first position to provide a first flow resistance through the control valve 214 and a second position (shown in dashed lines) to provide a second flow resistance through the control valve 214. The first flow resistance is lower than the second flow resistance. A movable reservoir member 216 (e.g. a compressible air bladder) is provided in the reservoir 204 and is movable based on the amount of fluid is in the reservoir 204 in such a way as to change the volume of the reservoir 204, such that the reservoir 204, the main piston chamber 202 and the first and second passageways 206 and 208 together are included in a fluid circuit that contains an incompressible fluid, such as hydraulic oil, and is substantially free of any compressible fluids, such as air. Such a strut is shown and described in PCT Patent Application publication WO2015/192253, the contents of which are hereby incorporated by reference.

Tensioner with Actuator-Driven Adjustable Load Stop Member

Figure 12:
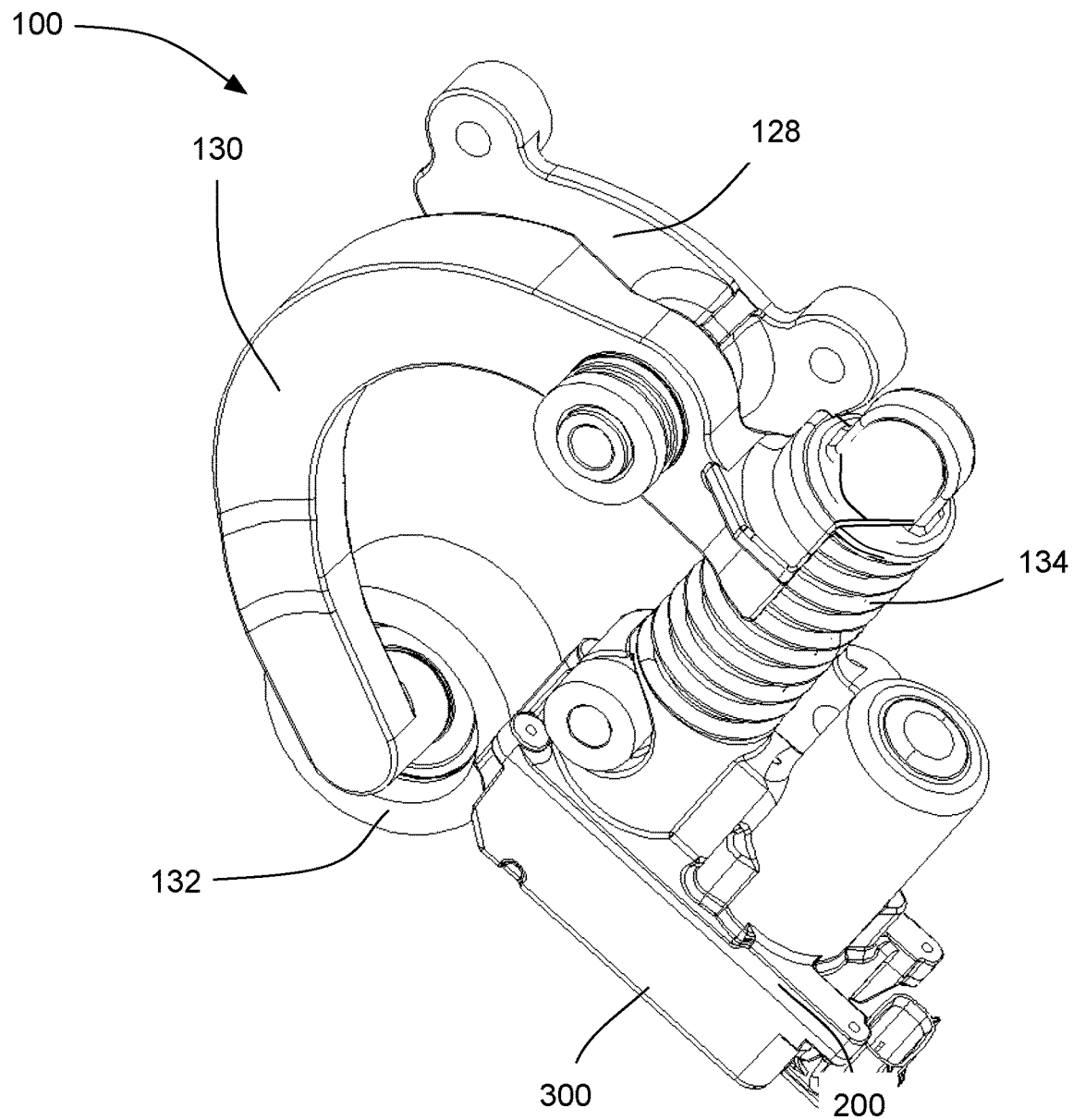
FIG. 12 is a perspective view of the tensioner shown in FIG. 7 with an optional control structure.
Figure 13:
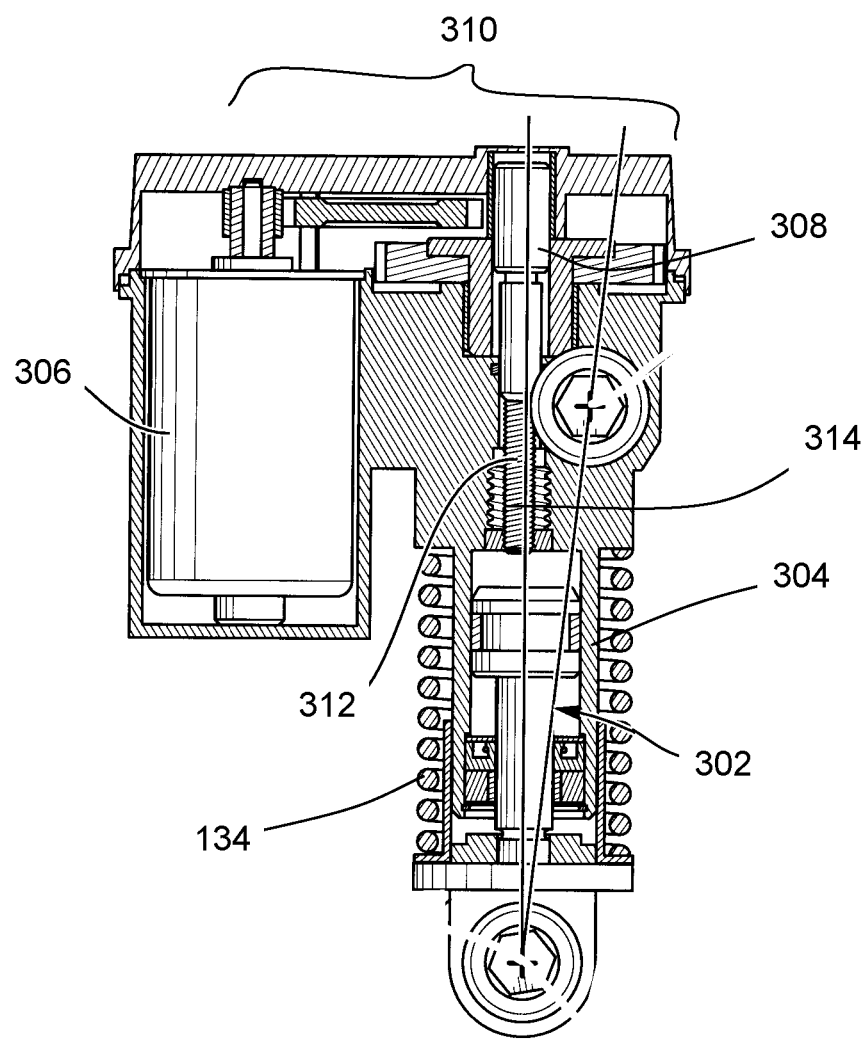
FIG. 13 is a sectional elevation view of the control structure shown in FIG. 12.

In another embodiment, shown in FIGS. 12 and 13, instead of a hydraulically controlled strut 200, the tensioner biasing member 134 is part of a strut 300, that renders the tensioner 100 suitable for use with a hybrid powertrain, in which the accessory 14 is not an alternator, but is instead an MGU, such that the belt span normally identified as being relatively slack becomes the tighter belt span when the MGU is powered so as to drive the belt 24.

The strut 300 includes an extensible member 302 that is pivotally connected to one of the tensioner arm 130 and a stationary member (e.g. the base 128), a housing 304 that is pivotally connected to the other of the tensioner arm 130 and a stationary member (e.g. the base 128), an actuator 306 (FIG. 11), and an adjustable load-stop member 308. The actuator 306 is operatively connected to the adjustable load stop member 308 to drive the adjustable load stop member 308 towards the extensible member 302.

The strut 300 may be as disclosed in PCT publication No. WO2013/159181A2, the contents of which are incorporated fully herein by reference. The extensible member 302 is slidably disposed in the housing 304. The extensible member 302 and the housing 304.

The adjustable load stop member 308 can be used to control the depth to which the extensible member 302 can be retracted into the housing 304. The load stop member 308 can be adjusted in position by the actuator 306 which is operatively connected to the adjustable load stop member 308 via a load stop drive arrangement 310, to drive the adjustable load stop member 308 towards (and optionally away from) the extensible member 302. In the embodiment shown, the adjustable load stop member 308 includes a threaded rod portion 312 that rotatable within a threaded bore 314 to drive the rod 308 longitudinally towards or away from the extensible member 302. The drive arrangement 310 may include a plurality of gears, one of which is shaped to rotatably drive the load stop member 308 but permits longitudinal movement of the load stop member 308.

The actuator 306 may be any suitable type of actuator, such as a bi-directional electric motor. The actuator 306 may be made sufficiently strong to drive the adjustable load-stop member 308 into the extensible member 302 with sufficient force to drive the pulley 132 into the belt 24 (FIG. 7), against the hub load applied by the belt 24 on the pulley 132, thereby permitting the belt tension to be increased as desired.

The use of a threaded rod portion 312 and corresponding threaded bore 314 can inherently prevent backdriving of the rod 312, thereby preventing compression of the strut even when the actuator 306 is not powered on.

It is possible to provide the strut 200 or 300 for use with the tensioner 26, instead of the tensioner 100. Thus the biasing member 34 could form part of the strut 200 or the strut 300, instead of the biasing member 134.

Some manufacturers may find it advantageous to provide their vehicles with relatively uniform component layouts underhood, such that the single armed tensioners shown in FIGS. 1a-9 could be used when the vehicle is configured as a non-hybrid vehicle, and the very similar tensioner 100 shown in FIGS. 10-13 could be used when the vehicle is configured as a hybrid vehicle.

Another advantage to the tensioners 26 and 100 is that the amount of belt takeup per degree of pivoting of the tensioner arm 30 (or the tensioner arm 130) may be relatively high and may exceed about 2 mm per degree of movement of the arm 30. As a result, relatively little compression of the biasing member 34 (or 134) takes place and therefore relatively little change in the force FS. This can result in a relatively flatter tension/position curve for the tensioner 26 (or 100), which is advantageous in that it can be easier to maintain a relatively uniform tension in the belt 24 over different positions of the tensioner arm 30 (or 130), as compared to some tensioners of the prior art. This can be particularly advantageous for relatively short belts 24 which undergo less stretch over their lifetimes. An example of a belt length that the tensioners shown in FIGS. 1-13 can be used with is 1200 mm. This belt length corresponds to the length of the belt 24 if the belt were cut at one point and laid out in a line. Other belt lengths are contemplated also, depending on the specific layout of the components of the endless drive arrangement.

Tensioners 26 and 100 may be advantageous in vehicles where it is desirable to maintain a large hood crush zone (i.e. a large amount of space underneath the hood to ensure that a collision with a pedestrian results in a low likelihood of the pedestrian hitting any 'hard' surfaces under the hood. By contrast, it is possible that the tensioner shown in FIG. 5b would position the distal end of the spring 30old in such a way that it is close to the hood thereby posing a risk of injury to a pedestrian.

While the tensioners 26 and 100 have been shown to mount to the end faces of the accessories, it will be understood that they could mount to any portion of the accessory frame 19 or in part to any other suitable stationary member.

Persons skilled in the art will appreciate that there are yet more alternative implementations and modifications possible, and that the above examples are only illustrations of one or more implementations. The scope, therefore, is only to be limited by the claims appended hereto.

Table Of Elements:

| Reference # | Item | FIG. # |
|---|---|---|
| AAcc | Accessory pulley axis | 3, 8 |
| AArm | Arm pivot axis | 3, 8 |
| AArmOld | Arm pivot axis (prior art) | 5b |
| ATP | Tensioner pulley axis | 3, 8 |
| CD | Center distance | 3, 8 |
| DAcc | Diameter of accessory frame body | 3, 8 |

-continued

Table Of Elements:

| Reference # | Item | FIG. # |
|---|---|---|
| OA | Offset angle | 3, 8 |
| FH | Hub load | 5a |
| FHOld | Hub load (prior art) | 5b |
| LH | Moment arm of hub load | 5a |
| LHOld | Moment arm of hub load (prior art) | 5b |
| FS | Force of biasing member | 5a |
| FSOld | Force of biasing member (prior art) | 5b |
| LS | Moment arm of force of biasing member | 5a |
| LSOld | Moment arm of force of biasing member (prior art) | 5b |
| 10 | Endless drive arrangement | 1a |
| 12 | Engine | 1a |
| 14 | Accessories | 1a |
| 16 | Crankshaft | 1a |
| 17 | Crankshaft pulley | 1a |
| 18 | Alternator/MGU | 1a |
| 19 | Accessory frame | 1b |
| 20 | Accessory shaft | 1a |
| 22 | Accessory pulley | 1b |
| 24 | Belt/Endless drive member | 1a |
| 26 | Tensioner | 1a, 1b |
| 28 | Tensioner base | 2, 3 |
| 30 | Tensioner arm | 2, 3 |
| 30old | Tensioner arm (prior art) | 5b |
| 32 | Tensioner pulley | 2, 3 |
| 32old | Tensioner pulley (prior art) | 5b |
| 34 | Tensioner biasing member | 2, 3 |
| 34old | Tensioner biasing member (prior art) | 5b |
| 36 | End face of accessory frame | 1b |
| 38 | Aperture | 1b |
| 39 | Accessory frame body | 1b |
| 40 | Aperture | 1b |
| 41 | Fastener | 3 |
| 42 | Bolt | 3 |
| 44 | Hollow shaft | 4 |
| 46 | Aperture | 4 |
| 48 | Bushing | 4 |
| 50 | Bushing | 4 |
| 52 | Bushing | 4 |
| 54 | Damping structure | 4 |
| 56 | Damping member | 4 |
| 58 | First friction surface | 4 |
| 60 | Second friction surface | 4 |
| 62 | Damping structure biasing member | 4 |
| 64 | Belleville washer | 4 |
| 66 | Tensioner arm locking member | 4 |
| 68 | Pulley bearing | 2 |
| 69 | Shoulder bolt | 2 |
| 70 | Dust shield | 2 |
| 71 | First end | 3 |
| 72 | First end support surface | 3 |
| 74 | Second end | 3 |
| 76 | Second end support surface | 3 |
| 80 | Bending stress curve | 6b |
| 82 | Bending stress curve | 6a |
| 90 | Pin | 2 |
| 92 | Aperture | 2 |
| 100 | Tensioner base | 9 |
| 128 | Tensioner base | 9 |
| 130 | Tensioner arm | 9 |
| 132 | Tensioner pulley | 2, 3 |
| 134 | Tensioner biasing member | 2, 3 |
| 140 | Second aperture | 9 |
| 141 | Fastener | 8 |
| 142 | Bolt | 8 |
| 144 | Hollow shaft | 9 |
| 146 | Aperture | 9 |
| 148 | Bushing | 9 |
| 150 | Bushing | 9 |
| 152 | Bushing | 9 |
| 154 | Damping structure | 9 |
| 200 | Strut | 10 |
| 202 | Piston chamber | 11 |
| 204 | Reservoir | 11 |
| 206 | First passageway | 11 |

-continued

Table Of Elements:

| Reference # | Item | FIG. # |
|---|---|---|
| 208 | Second passageway | 11 |
| 210 | Piston | 11 |
| 212 | Check valve | 11 |
| 214 | Control valve | 11 |
| 216 | Bladder | 11 |
| 300 | Strut | 12 |
| 302 | Extensible member | 13 |
| 304 | Housing | 13 |
| 306 | Actuator | 13 |
| 308 | Adjustable load stop member | 13 |
| 310 | Drive arrangement | 13 |
| 312 | Threaded rod portion | 13 |
| 314 | Threaded bore | 13 |

What is claimed is:

1. A tensioner for an endless drive arrangement for an engine having a crankshaft, a crankshaft pulley, an endless drive member that is engageable with the crankshaft pulley, an accessory including an accessory frame having a generally cylindrical body having a frame body diameter, an accessory shaft that is rotatable relative to the accessory frame and an accessory pulley that is mounted to the accessory shaft and is rotatable about an accessory pulley axis, the tensioner comprising:
a base;
a tensioner arm having a tensioner pulley thereon, wherein the tensioner arm is generally concave and is pivotally mounted to the base for pivotal movement about an arm pivot axis that is offset from the accessory pulley axis, and wherein the tensioner pulley is rotatably mounted to the tensioner arm for rotation about a tensioner pulley axis that is offset relative to the arm pivot axis and relative to the accessory pulley axis, wherein the endless drive member engages the tensioner pulley and applies a hub load on the tensioner pulley and thereby applies a hub load moment on the tensioner arm along a first moment arm relative to the arm pivot axis;
and a tensioner biasing member that urges the tensioner arm into the endless drive member and applies a biasing member moment on the tensioner arm that opposes the hub load moment along a second moment arm relative to the arm pivot axis, wherein the second moment arm is at least about 50 percent of the length of the first moment arm, wherein the tensioner is mountable to the accessory frame via a plurality of fasteners that are each positioned at a center distance from the accessory pulley axis, wherein the center distance for each of the fasteners from the plurality of fasteners is between a value of zero inches from the accessory pulley axis to a value that is less than about 25 mm greater than the frame body diameter.

2. A tensioner as claimed in claim 1, wherein the tensioner biasing member is a compression spring.

3. A tensioner as claimed in claim 1, wherein the second moment arm is at least 80 percent of the length of the first moment arm.

4. A tensioner as claimed in claim 1, wherein the second moment arm is approximately equal to the length of the first moment arm.

5. A tensioner as claimed in claim 2, wherein the tensioner pulley axis is angularly offset by an offset angle that is about 180 degrees along the tensioner arm relative to the arm pivot axis, about the accessory pulley axis.

6. A tensioner as claimed in claim 1, wherein the tensioner biasing member is substantially completely superimposed axially with the tensioner arm.

7. A tensioner as claimed in claim 1, wherein the tensioner arm is concave about the accessory pulley axis.

8. A tensioner as claimed in claim 1, wherein the arm pivot axis and the tensioner pulley axis have an angular offset of between about 135 degrees and about 225 degrees about the accessory pulley axis.

9. A tensioner as claimed in claim 1, wherein pivoting of the tensioner arm in a free arm direction about the arm pivot axis results in takeup of the endless drive member, and wherein the arm pivot axis and the tensioner pulley axis are positioned such that a ratio of a number of millimeters of takeup of the endless drive member per degree of movement of the tensioner arm is greater than 2.

10. A tensioner as claimed in claim 9, wherein the endless drive member is approximately 1200 mm long.

11. A tensioner for an endless drive arrangement for an engine having a crankshaft, a crankshaft pulley, an endless drive member that is engageable with the crankshaft pulley, an accessory including an accessory frame, an accessory shaft that is rotatable relative to the accessory frame and an accessory pulley that is mounted to the accessory shaft and is rotatable about an accessory pulley axis, the tensioner comprising:
a base;
a tensioner arm having a tensioner pulley thereon, wherein the tensioner arm is generally concave and is pivotally mounted to the base for pivotal movement about an arm pivot axis that is offset from the accessory pulley axis, and wherein the tensioner pulley is rotatably mounted to the tensioner arm for rotation about a tensioner pulley axis that is offset relative to the arm pivot axis and relative to the accessory pulley axis; and
a tensioner biasing member that urges the tensioner arm into the endless drive member, wherein the tensioner biasing member is a compression spring, wherein the tensioner is mountable to the accessory frame via a plurality of fasteners that are each positioned at a center distance from the accessory pulley axis, wherein the center distance for each of the fasteners from the plurality of fasteners is between a value of zero inches from the accessory pulley axis to a value that is less than about 25 mm greater than the frame body diameter, and wherein the arm pivot axis and the tensioner pulley axis have an angular offset of between about 135 degrees and about 225 degrees about the accessory pulley axis.

12. A tensioner as claimed in claim 11, wherein the tensioner biasing member has a first end, and further has a second end that is positioned to transfer a biasing force into a second end support surface on the tensioner arm, wherein the second end support surface is outside of a range between the arm pivot axis and the tensioner pulley axis.

13. A tensioner as claimed in claim 11, wherein the tensioner biasing member is engaged at a first end with the base and at a second end with the tensioner arm.

14. A tensioner as claimed in claim 11, wherein the tensioner arm biasing member is part of a tensioner strut that is controllable during use to prevent compression of the tensioner strut at any of a plurality of selectable positions.

15. A tensioner as claimed in claim 14, wherein the tensioner strut includes an extensible member that is pivotally connected to one of the tensioner arm and a stationary member, a housing that is pivotally connected to the other of the tensioner arm and a stationary member, an actuator, and an adjustable load-stop member, wherein the actuator is operatively connected to the adjustable load stop member to drive the adjustable load stop member towards the extensible member.

16. A tensioner as claimed in claim 15, wherein the actuator is drivable to drive the adjustable load stop member into the extensible member with sufficient force to drive the pulley into the endless drive member to increase tension in the endless drive member.

17. A tensioner as claimed in claim 11, wherein pivoting of the tensioner arm in a free arm direction about the arm pivot axis results in takeup of the endless drive member, and wherein the arm pivot axis and the tensioner pulley axis are positioned such that a ratio of a number of millimeters of takeup of the endless drive member per degree of movement of the tensioner arm is greater than 2.

18. A tensioner as claimed in claim 17, wherein the endless drive member is approximately 1200 mm long.

19. A tensioner as claimed in claim 11, wherein the tensioner pulley axis is angularly offset by an offset angle that is about 180 degrees along the tensioner arm relative to the arm pivot axis, about the accessory pulley axis.

20. A tensioner as claimed in claim 11, wherein the tensioner biasing member is substantially completely superimposed axially with the tensioner arm.

* * * * *